US006000114A

United States Patent [19]

Newton et al.

[11] Patent Number: 6,000,114

[45] Date of Patent: Dec. 14, 1999

[54] INSERTION TOOL

[75] Inventors: David W. Newton, Bethel; William J. Lutkus, Watertown, both of Conn.

[73] Assignee: Emhart Inc., Newark, Del.

[21] Appl. No.: 09/001,903

[22] Filed: Dec. 31, 1997

[51] Int. Cl.[6] .................... B23P 19/04

[52] U.S. Cl. .................... 29/240.5; 81/459

[58] Field of Search .................... 29/240.5, 809; 81/448, 443, 451, 452, 454, 453, 455, 459

[56] References Cited

U.S. PATENT DOCUMENTS

| | | |
|---|---|---|
| 3,111,751 | 11/1963 | Eddy . |
| 3,146,521 | 9/1964 | Steinmeyer . |
| 3,579,793 | 5/1971 | Williams et al. . |
| 4,528,737 | 7/1985 | Cosenza et al. . |
| 4,553,302 | 11/1985 | Cosenza et al. . |
| 4,553,303 | 11/1985 | Yamamoto . |
| 4,768,270 | 9/1988 | Czarnowski . |
| 5,212,865 | 5/1993 | Davis et al. . |
| 5,456,145 | 10/1995 | Cosenza . |

*Primary Examiner*—P. W. Echols
*Assistant Examiner*—John C. Hong
*Attorney, Agent, or Firm*—Edward D. Murphy

[57] ABSTRACT

An insertion tool 48 is used to insert a threaded coil insert 26 into a threaded opening 22 of a support structure 20. The tool 48 includes a rotatable mandrel 50 having a first slot 62 for receiving a blade 76, the forward end of which is formed with a drive hook 94. The drive hook 94 is located in an end opening 64 of the mandrel 50 and is selectively movable through a second slot 66 formed in the mandrel. The first slot 64, the second slot 66 and the end opening 64 are in communication. The blade 76 is formed with a nib 78 which is normally biased into a chamber 112, but is selectively precluded from doing so by selective movement of a bushing 110 which is attached to an axially movable sleeve 102. As the threaded insert 26 is placed on a threaded end of the mandrel 50, the sleeve 102 is moved rearward to move the bushing 110 from engagement with the nib 78 whereby the biased nib moves into the chamber 112. The blade 76 thereby pivots to move the drive hook 94 through the second slot 66 of the mandrel 50 whereby the drive hook moves into a drive slot 40 formed in the insert 26. Upon rotation of the mandrel 50 and the blade 76, the insert 26 is driven threadedly into the threaded opening 22 of the support structure 20.

20 Claims, 3 Drawing Sheets

20
22
24
32

26
28
30
36
38
46
40
44

4
26
34
36
38
40
42
44
46

26
28
30
34
36
38
40
42
44
46
76
82
94

INSERTION TOOL

BACKGROUND OF THE INVENTION

This invention relates to an insertion tool, and particularly relates to a power driven tool for inserting tang-free helical coil inserts into tapped openings.

Helical coil inserts have been used for some time to revitalize worn or damaged threads of openings in support structures. Such inserts also have been used to provide a durable threaded opening in support structures which are composed of materials which may not be sufficiently durable to support long-term use of threads therein. The threads of the coil inserts will remain durable for a longer period, compared to the threads of the opening of the support structure, even though there may be frequent removal and reinsertion, or replacement, of threaded fasteners eventually mounted in threaded opening of the coil insert.

The helical coil inserts are typically made from a preformed metal wire, typically formed with a diamond cross section, which is wound to form a helical coil having successive convolutions. The helical coil is referred to herein as a "coil insert." The coil insert is wound in such a manner that outer and inner threads are formed by sharp, generally "V" shaped portions on opposite sides of the diamond cross section on the outer and inner surfaces, respectively, of the insert.

The size of the outer threads of the coil insert are consistent with the size of the threads of the opening in the support structure. The size of the inner threads of the coil insert are consistent with the size of the threads typically formed on a portion of the outer surface of the threaded fastener, which is eventually threadedly mounted in coil insert.

In the past, one end of the coil insert was formed with a straight tang to extend diametrically across the immediately adjacent full convolution, and was used to drive the coil insert into the threaded opening of the support structure. In more recent times, the coil insert has not been formed with the tang, but has been formed with a drive slot on the inside of the last convolution near the end of the insert which serves as the facility to drive the insert into the threaded opening of the support structure.

In the past, the coil inserts have been assembled by use of a tool such as, for example, the tool disclosed in U.S. Pat. No. 4,528,737, which issued on Jul. 16, 1985. The tool of the '737 patent includes a rotatable rod having a cutout extending longitudinally through a portion thereof, but which is closed at opposite ends thereof, including a coil insertion end of the tool. The rod is formed with threads on the exterior thereof which begin inboard of the insertion end of the tool and extend toward the opposite end thereof. A longitudinal pawl is mounted pivotally in the cutout and is formed with a pair of lead ramps extending inboard from the insertion end of the pawl. The rod is also formed with a hook portion inboard of the lead ramps and is biased so that the ramps and the hook portion can protrude through a lateral aperture formed through the rod and in communication with the cutout.

In use of the tool of the '737 patent, the coil insert is threadedly assembled on the insertion end of the rod until the biased hook portion is located in the drive slot of the insert. At this juncture, the lead end of the coil insert and the hook portion are located somewhat rearward of the insertion end of the rod and the tool. A power driver is then used to rotate the rod and the pawl, as the insert and rod are inserted into the threaded opening of the support structure, whereby the hook portion drives the insert into the threaded opening.

As noted, the lateral aperture of the rod is spatially located from the closed insertion end of the rod, which limits the depth to which the coil insert can be mounted in the threaded opening of the support structure. Also, the forward location of the lead ramps on the pawl results in the hook portion being located an additional rearward distance from the insertion end of the rod, thereby further limiting the depth location of the insert within the threaded opening of the support structure. With this tool structure, the threaded opening in the support structure must be formed with adequate axial depth at the bottom thereof to allow for the axial length of the closed end of the rod and the axial length of the lead ramps of the pawl. The adequate axial depth of the threaded opening is required to insure that the trailing end of the insert coil is flush with the external surface of the support structure, adjacent the opening, upon completion of the insertion operation.

Thus, there is a need for an insertion tool which will insert the coil insert as fully as possible within the threaded opening of the support structure in an efficient and effective manner. Further, there is a need for an insertion tool which will locate the trailing end of the coil insert flush with the external surface of the support structure without the necessity for providing significant axial clearance depth at the bottom of the opening.

SUMMARY OF THE INVENTION

It is, therefore, an object of this invention to provide an insertion tool for inserting a threaded insert within a threaded opening of a support structure in an efficient and effective manner.

Another object of this invention to provide an insertion tool for inserting a threaded insert fully within a threaded opening of a support structure.

Still another object of this invention is to provide an insertion tool for inserting a threaded insert within a threaded opening of a support structure where the trailing end of the insert is flush with the external surface of the support structure, adjacent the opening, without the necessity for providing significant axial clearance at the bottom of the threaded opening.

With these and other objects in mind, this invention contemplates an insertion tool for inserting a threaded insert within a threaded opening of a support structure. The tool includes a rotatable mandrel having a mandrel insertion end and a driven end, located at opposite ends of a longitudinal axis of the mandrel. A first slot is formed in the mandrel on a first side thereof. The depth of the first slot extends in a transaxial direction and the length of the first slot extends in an axial direction from the insertion end of the mandrel toward the driven end thereof.

An end opening is formed in the mandrel at the mandrel insertion end and is in communication with the first slot. The mandrel is also formed with a second slot on a second side of the mandrel, opposite the first side thereof. The second slot extends transaxially into the mandrel and is in communication with the first slot and the end opening at the mandrel insertion end.

A blade is located in the first slot of the mandrel and includes a blade insertion end which is extends into the end opening at the mandrel insertion end. The blade is formed with a drive hook at the insertion end thereof which is located adjacent the second slot inboard of the first slot and which is movable outward through the second slot.

Other objects, features and advantages of the present invention will become more fully apparent from the following detailed description of the preferred embodiment, the appended claims and the accompanying drawings.

DETAILED DESCRIPTION OF THE PREFERRED EMBODIMENT

Figures 1, 2, 3, 4:
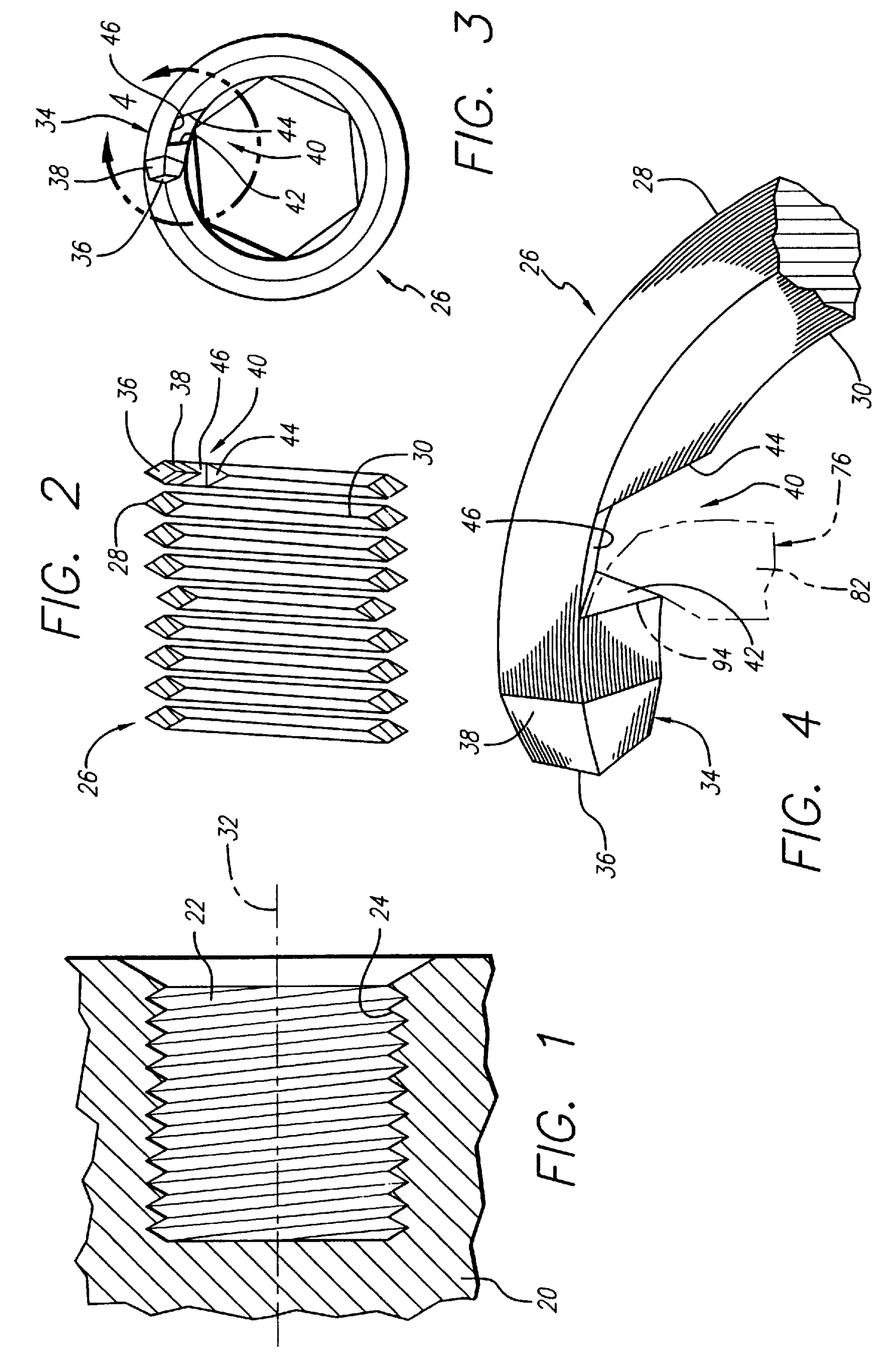
FIG. 1 is a sectional view showing a support structure with a threaded opening formed therein.
FIG. 2 is a sectional view showing the structure of a helical coil insert for assembly within the threaded opening of FIG. 1.
FIG. 3 is an end view of the helical coil insert of FIG. 2 showing a tang-less end of the insert with a drive slot formed therein.
FIG. 4 is a partial view taken within line 4 of FIG. 3 showing an enlargement of a drive end of the tang-free insert of FIG. 3, and showing in phantom a drive hook, in accordance with certain principals of the invention.

As shown in FIG. 1, a support structure 20 is formed with a threaded opening 22 having a plurality of threads 24 formed therein. Referring to FIG. 2, a helical coil insert 26 is typically made from a preformed metal wire, typically formed with a diamond cross section, which is wound to form a helical coil having successive convolutions. The coil insert 26 is wound in such a manner that outer threads 28 and inner threads 30 are formed by sharp, generally "V" shaped portions on opposite sides of the diamond cross section on the outer and inner surfaces, respectively, of the insert.

The size of the outer threads 28 of the coil insert 26 are consistent with the size of the threads 24 of the opening 22 in the support structure 20. The size of the inner threads 30 of the coil insert 26 are consistent with the size of the threads typically formed on a portion of the outer surface of a threaded fastener (not shown), which eventually is to be threadedly mounted in coil insert.

The coil insert 26 may be used for facilitating the effective reconstruction of a fastener-receiving threaded opening in the support structure 20. In the reconstruction process, the original opening in the support structure 20, as shown in FIG. 1, is bored to remove worn or damaged threads, whereby an oversize, smooth-walled passage is formed about an axis 32. The passage is then tapped to form the threaded opening 22 having the threads 24 of a prescribed size.

If the material from which the support structure 20 is formed is not of acceptable durable quality, the threaded opening 22, and threads 24, may be formed at the time plans are first made to use the support structure for receiving a threaded fastener.

Regardless of whether the coil insert 26 is used in a reconstruction process, or in the initial formation of a fastener-receiving opening, the opening 22 and the threads 24 are formed in the support structure 20 as shown in FIG. 1 in preparation for receipt of the durable coil insert 26.

Referring to FIGS. 3 and 4, the coil insert 26 is formed with a leading end 34 which includes a leading surface 36 and truncated sides 38. A drive slot 40 is formed in the underside of the leading end 34 just behind the truncated sides 38. The drive slot 40, in the preferred embodiment, is formed by two spaced interfacing walls 42 and 44 and a ceiling 46 by cutting away the radially inside half of the diamond cross section. In addition, the spaced walls 42 and 44 are sloped radially inward and rearward toward a trailing end of the coil insert 26.

Figure 5:
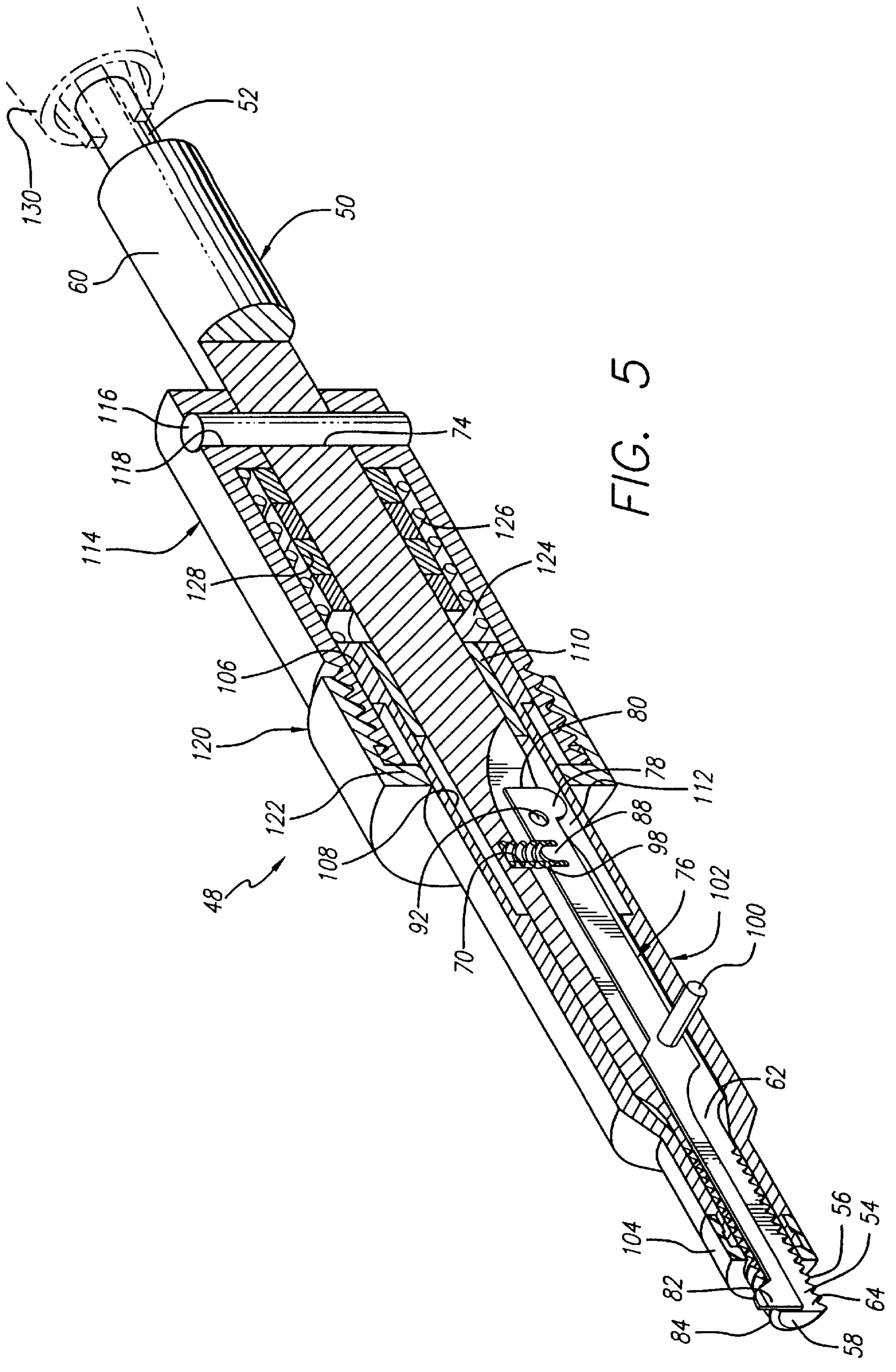
FIG. 5 is a sectional view showing an insertion tool for inserting the insert of FIG. 2 into the opening of FIG. 1 in accordance with certain principles of the invention.

As shown in FIG. 5, an insertion tool 48 is used for inserting the coil insert 26 threadedly into the threaded opening 22 of the support structure 20. The tool 48 includes a rotatable mandrel 50, also shown in FIGS. 6 and 7, which is formed with a drive shank 52 at a trailing end thereof and a forward extension 54 at a mandrel insertion end thereof. The forward extension 54 of the mandrel 50 is formed with threads 56 externally thereof which are the same size as the inner threads 30 of the coil insert 26. The forward extension 54 is also formed with a forward end face 58 which is the forwardmost surface of the mandrel 50. An intermediate section 60 of the mandrel 50 extends between the drive shank 52 and the forward extension 54, and is formed generally with a circular cross section.

Figures 6, 7, 8, 9, 10:
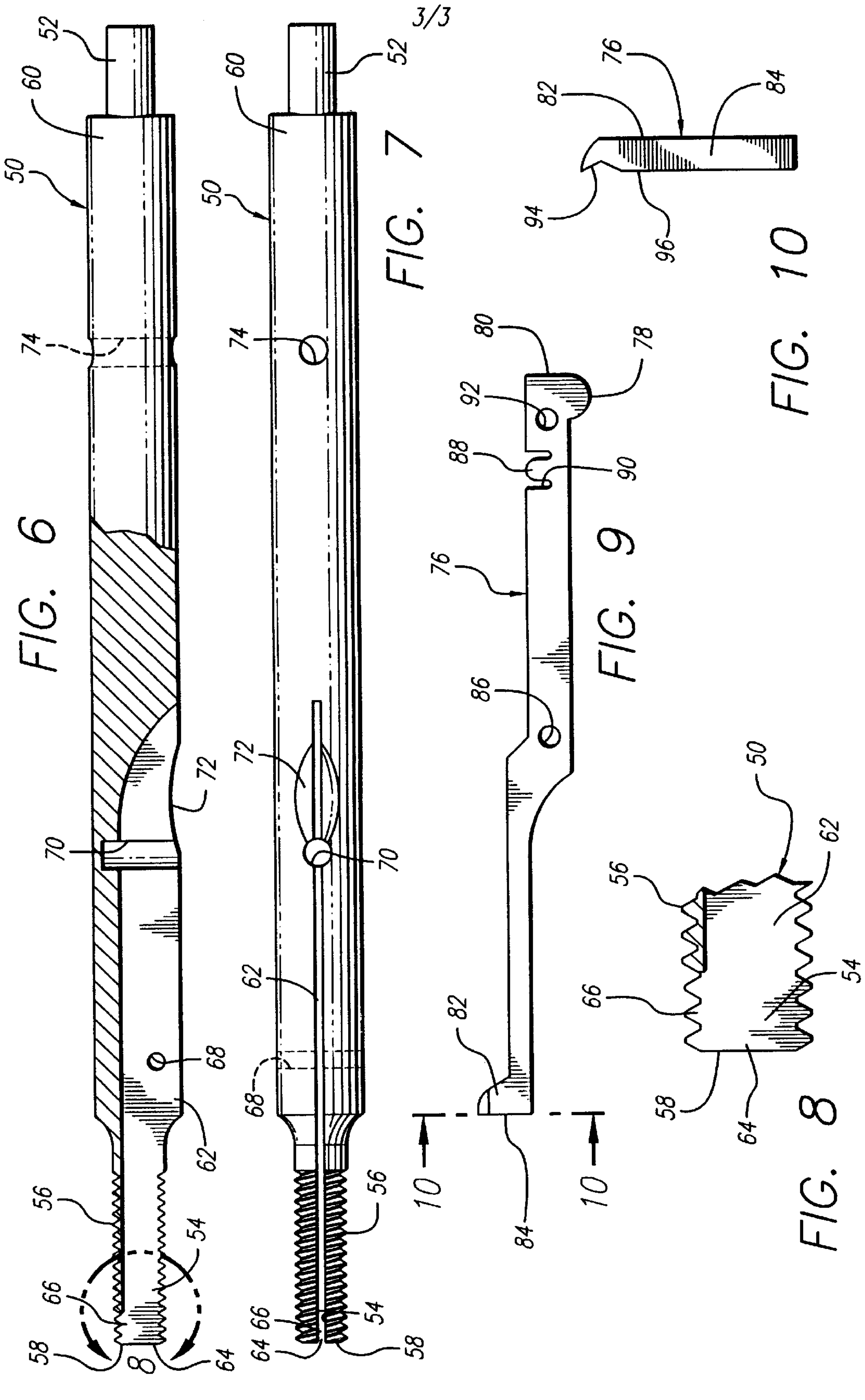
FIG. 6 is a partial sectional view showing of a mandrel of the tool of FIG. 4 in accordance with certain principles of the invention.
FIG. 7 is a side view showing the mandrel of the tool of FIG. 4 in accordance with certain principles of the invention.
FIG. 8 is a partial side view of an insertion end of the mandrel of FIGS. 6 and 7 showing first and second slots and an insertion end opening of the mandrel in communication in accordance with certain principles of the invention.
FIG. 9 is a side view showing a blade and the drive hook of FIG. 4 in accordance with certain principles of the invention.
FIG. 10 is an end view of the blade showing the profile of the drive hook formed on the insertion of the blade in accordance with certain principles of the invention.

Referring to FIGS. 6, 7 and 8, the mandrel 50 is formed with a first slot 62 in a first side thereof which extends transaxially into the mandrel but does not extend to the opposite side thereof. A forward end opening or end slot 64 is formed in the forward end face 58 of the mandrel 50 and communicates with the first slot 62. A second slot 66 is formed in the forward extension 54 transaxially into the mandrel 50 in a second side, which is diametrically opposite the first side, and is in communication with the first slot 62 and the end opening 64. The first slot 62, the end opening 64 and the second slot 66 are formed with the same width.

As shown in FIGS. 6 and 7, the mandrel 50 is formed with a pivot pin opening 68 laterally on each side of the first slot 62 at a juncture near the axial middle of the first slot. A spring cavity 70 is formed in the mandrel 50 generally in the plane of the first slot 62 and rearward of the opening 68. The cavity 70 is open to the first side of the mandrel 50 as the first slot 62, and extends deeper into the mandrel than the first slot but does not extend through the mandrel. A concave section 72 is formed in the exterior surface of the mandrel 50 at the first side thereof and trails the exterior opening of the cavity 70. A body pin hole 74 is formed through the mandrel 50 near the shank 52 thereof.

As shown in FIGS. 5 and 9, a blade 76 is formed in a longitudinal direction and with a thickness slightly less than the width of the first slot 62 of the mandrel 50. A rounded nib 78 extends laterally in one direction from a trailing end 80 of the blade 76, and a drive extension 82 extends laterally in an opposite direction from a forward or insertion end face 84 of the blade. A pivot pin opening 86 is formed through a central portion of the blade 76. A spring-support finger 88 is formed in the blade 76 and extends from within a well 90 in a direction opposite the direction of the nib 78, slightly inboard of the trailing end 80. Another hole 92 is formed through the blade 76 and is located between the nib 78 and the finger 88. Referring to FIG. 10, the drive extension 82 of the blade 76 is formed with a drive hook 94 on a lateral side 96 of the blade.

Referring to FIG. 5, a spring 98 is placed onto the finger 88 and the blade 76 is moved into the first slot 62 of the mandrel 50 so that the spring moves into the cavity 70 and is compressed to apply a normal clockwise bias, as viewed in FIG. 5, to the blade. A pivot pin 100 is inserted into the opening 68 of the mandrel 50 and the opening 86 of the blade 76 to couple the blade to the mandrel for pivoting movement within the first slot 62. When the blade 76 is in the position shown in FIG. 5, the drive extension 82 is extended through the second slot 66 (FIG. 8) under the biasing action of the spring 98.

As shown in FIG. 5, the forward or insertion end of the blade 76 is located within the forward end opening 64 of the mandrel 50 and is positioned so that the forward end face 84 of the blade is, at all times, flush with the forward end face 58 of the mandrel. In this manner, the forward end of the blade 76 is always at the forwardmost location of the tool 48. In addition, the drive hook 94 of the blade 76 extends inward from the forward end face 58 through the thickness of the drive extension 82. Therefore, the drive hook 94 is always at the forwardmost location of the tool 48.

The forward half of the mandrel 50 is located within a sleeve 102 having a plastic spinner 104 attached to a forward end thereof and formed with a flange 106 at a rear end thereof. The sleeve 102 is formed internally in the rear half thereof with an enlargement 108 and a bushing 110 is press fit, or otherwise secured, within the rear end of the enlargement. This arrangement forms a first chamber 112 into which the nib 78 of the blade 76 may be biasingly located as illustrated. It is noted that the sleeve 102 and the bushing 110 could be formed as a single piece without departing from the spirit and scope of the invention.

A cylindrical body 114 is located about the intermediate section 60 of the mandrel 50 and is secured to the mandrel by a pin 116 which is passed through a split opening 118, formed in the body, and the opening 74 in the mandrel. The flange 106 of the sleeve 102 is located for sliding movement relative to the interior of the body 114. A cup-like nut 120 is located about the middle of the intermediate section 60 of the mandrel 50 and is threadedly attached to a forward end of the body 114. A forward wall 122 of the nut 120 and the interior of the body 114 combine to form a second chamber 124 in which the flange 106 of the sleeve 102 is captured. A spring 126 is located within the second chamber 124 and normally urges the sleeve 102 and the bushing 110 in a forward direction. A selected number of washer-like spacers 128 are located within the second chamber 124, and are positioned about the intermediate section 60 of the mandrel 50, to limit the rearward movement of the sleeve 102 and the bushing 110.

In an "at rest" or normal condition when the tool 48 is not being used, the spring 126 biases the flange 106 and the bushing 110 to the forwardmost position whereby the flange engages the inboard side of the forward wall 122 of the nut 120. In this position, the forward end of the sleeve 102 and the spinner 104 essentially cover the threads 56 of the mandrel 50. Also, the bushing 110 is now located in a forward section of the first chamber 112 and has engaged the nib 78 of the blade 76 to move the nib upward, as viewed in FIG. 5, against the biasing action of the spring 98. During the period when the bushing 110 is in engagement with the nib 78, as described above, the blade 76 is pivoted about the pin 100 to retract the drive extension 82 to a position within the first slot 62 of the mandrel 50. In this manner, the drive extension 82 and the drive hook 94 are not unnecessarily exposed during any period when the tool 48 is in the normal condition.

When the tool 48 is to be used, the trailing non-slotted end of the coil insert 26 is threaded onto the forward end of the threads 56 of the mandrel 50 by virtue of the threads 56 and the inher threads 30 of the insert being of the same size. As the insert 26 is threaded onto the forward end of the mandrel 50, the trailing end of the insert engages the forward face of the spinner and urges the sleeve 102 rearward against the biasing action of the spring 126. As the sleeve 102 is being moved rearwardly, the bushing 110 is moved rearward relative to the nib 78 of the blade 76. During this period, the drive extension 82 remains retracted within the first slot 62 because the bushing 110 continues to engage and urge the nib 78 radially inward of the slot 62.

Eventually, as the coil insert is being mounted onto the threaded end of the mandrel 50, the bushing 110 is moved rearward sufficiently to clear the nib 78 whereafter the biasing action of the spring 98 urges the nib in a radially outward direction to pivot the drive extension toward the second slot 66. The drive slot 40 of the coil insert 26 is moved into position to receive the drive hook 94 of the blade 76 in the manner illustrated in FIG. 4. The shank 52 of the "loaded" tool 48 is attached to a power driver 130 to prepare the tool for threadedly inserting the coil insert 26 into the threaded opening 22 of the support structure 20. The power driver 130 could be, for example, an electronic torquesensing driver available from Hios as their Model SB 650C.

The forward end of the tool 48 is positioned at the mouth of the threaded opening 22 of the support structure 20 and the leading end of the coil insert 26 is positioned to threadedly engage the threads 24 of the opening. Thereafter, the power driver 130 is operated and the drive hook 94 is rotated against the wall 42 of the slot 40, formed in the coil insert 26, to literally drive the convolutions of the insert into the helical path formed by the threads 24 of the opening 22. Eventually, the forward face of the spinner 104 engages the support structure 20 which causes the sleeve 102 to move further rearward until the flange 106 engages the lead spacer 128. At this time, the power driver 130 senses the increase torque requirement and reverses the direction of rotation of the mandrel 50 to withdraw the threads 56 from engagement with the threads 30 of the coil insert 26.

The number of spacers 128 to be used, or a single spacer of a given axial length to be used, is directly linked to the axial length of the coil insert 26. For short coil inserts 26, relatively more spacers would be required when compared to the number of spacers required for longer coil inserts.

Since the drive extension 82 and the drive hook 94 are located at the forwardmost location of the tool 48, and since the drive hook is located in the drive slot 40 at the fowardmost portion of the coil insert 26, the tool will drive the insert as far as possible into the opening 22 of the support structure 20. There is no tool structure forward of the drive hook 94 which requires a deeper opening 22 for clearance thereof as the tool reaches the base of the opening. Further, the presence of the bushing 110 maintains the drive extension 82 of the blade 76 in a retracted position within the mandrel slot 62 until the coil insert 26 has been located on the threads 56 of the mandrel 50. Thereafter, the biasing action of the spring 70 urges the drive hook 94 into position within insert slot 40. Thus, there is no need for length-extending camming ramps at the forward end of the blade 76.

In general, the above-identified embodiments are not to be construed as limiting the breadth of the present invention. Modifications, and other alternative constructions, will be apparent which are within the spirit and scope of the invention as defined in the appended claims.

What is claimed is:

1. An insertion tool for inserting a threaded insert within a threaded opening of a support structure, which comprises:

a rotatable mandrel having a mandrel insertion end and a driven end located at opposite ends of a longitudinal axis of the mandrel;

a first slot formed in the mandrel on a first side thereof, the depth of which extends in a transaxis direction and the length of which extends in an axial direction from the insertion end of the mandrel toward the driven end thereof;

an end opening formed in the mandrel at the mandrel insertion end which is in communication with the first slot;

a second slot formed on a second side of the mandrel opposite the first side thereof;

the second slot extending transaxially into the mandrel in communication with the first slot and the end opening at the mandrel insertion end;

a blade located in the first slot of the mandrel;

an insertion end formed on the blade which extends into the end opening of the mandrel; and a drive hook formed on the insertion end of the blade which is located adjacent the second slot normally within the first slot and which is movable outward through the second slot.

2. The insertion tool as set forth in claim 1, which further comprises:

a forward end face formed on the mandrel at a forward-most location of the insertion tool; and a forward end face formed on the blade in a position flush with the forward end face of the mandrel.

3. The insertion tool as set forth in claim 2, wherein the drive hook is formed laterally of, and is contiguous with, the forward end face of the blade.

4. The insertion tool as set forth in claim 1, wherein the drive hook is formed with an open face which is located at a forwardmost position of the insertion tool.

5. The insertion tool as set forth in claim 1, which further comprises:

means for normally urging the drive hook through the second slot; and means for selectively precluding the locating of the urged drive hook through the second slot.

6. The insertion tool as set forth in claim 5, wherein:

the urging means is a spring in normal engagement with the blade; and the precluding means is a movable structure selectively locatable in engagement with the blade.

7. The insertion tool as set forth in claim 1, which further comprises:

a chamber;

a nib formed on the blade and positionable in the chamber;

a spring for normally urging the nib into the chamber; and a movable structure selectively locatable within the chamber in engagement with the nib for selectively precluding movement of the nib in response to the urging action of the spring.

8. The insertion tool as set forth in claim 7, which further comprises:

a sleeve located about the mandrel for axial movement relative thereto;

the movable structure forming a portion of the sleeve.

9. The insertion tool as set forth in claim 1, which further comprises:

a first chamber;

a second chamber;

the blade formed with a nib which is normally urged into the first chamber;

a sleeve having a portion selectively movable within the first chamber for selectively precluding the nib from moving into the first chamber;

a portion of the sleeve being located in the second chamber; and a spring located in the second chamber for normally urging the sleeve to a position to preclude the nib from moving into the first chamber.

10. The insertion tool as set forth in claim 9, which further comprises:

a stop located in the second chamber for limiting the movement of the portion of the sleeve located within the second chamber.

11. The insertion tool as set forth in claim 1, wherein the blade is mounted for pivoting movement within the first slot.

12. An insertion tool for inserting a threaded insert within a threaded opening of a support structure, which comprises:

a rotatable mandrel having a mandrel insertion end and a driven end located at opposite ends of a longitudinal axis of the mandrel;

a first slot formed in the mandrel on a first side thereof, the depth of which extends in a transaxis direction and the length of which extends in an axial direction from the insertion end of the mandrel toward the driven end thereof;

a second slot formed on a second side of the mandrel opposite the first side thereof;

the second slot being axially open at the insertion end of the mandrel and extending transaxially into the mandrel in communication with the first slot;

a blade located in the first slot of the mandrel;

an insertion end formed on the blade;

a drive hook formed on the insertion end of the blade which is located for movement in the first slot and which is movable outward through the second slot;

means for normally urging the drive hook through the second slot; and means for selectively precluding the locating of the biased drive hook through the second slot.

13. The insertion tool as set forth in claim 12, wherein:

the urging means is a spring in normal engagement with the blade; and the precluding means is a movable structure selectively locatable in engagement with the blade.

14. The insertion tool as set forth in claim 12, which further comprises:

a chamber;

a nib formed on the blade and positionable in the chamber;

a spring for normally urging the nib into the chamber; and a movable structure selectively locatable within the chamber in engagement with the nib for selectively precluding movement of the nib in response to the biasing action of the spring.

15. The insertion tool as set forth in claim 14, which further comprises:

a sleeve located about the mandrel for axial movement relative thereto;

the movable structure forming a portion of the sleeve.

16. The insertion tool as set forth in claim 12, which further comprises:

a first chamber;

a second chamber;

the blade formed with a nib which is normally urged into the first chamber;

a sleeve having a portion selectively movable within the first chamber for selectively precluding the nib from moving into the first chamber;

a portion of the sleeve being located in the second chamber; and a spring located in the second chamber for normally urging the sleeve to a position to preclude the nib from moving into the first chamber.

17. The insertion tool as set forth in claim 16, which further comprises:

a stop located in the second chamber for limiting the movement of the portion of the sleeve located within the second chamber.

18. The insertion tool as set forth in claim 12, wherein the blade is mounted for pivoting movement within the first slot.

19. The insertion tool asset forth in claim 15, wherein the movable structure is a bushing which is attached to the sleeve.

20. The insertion tool as set forth in claim 12, wherein the drive hook is formed with an open face which is located at a forwardmost position of the insertion tool.

* * * * *